United States Patent
Takanaga et al.

(10) Patent No.: US 12,545,581 B2
(45) Date of Patent: Feb. 10, 2026

(54) METHOD FOR PURIFYING YELLOW PHOSPHORUS AND METHOD FOR PRODUCING HIGH-PURITY PHOSPHORIC ACID

(71) Applicant: RIN KAGAKU KOGYO CO., LTD., Toyama (JP)

(72) Inventors: Manabu Takanaga, Toyama (JP); Norihiro Tsukada, Toyama (JP); Katsuhiro Yano, Toyama (JP); Akinori Shimono, Toyama (JP)

(73) Assignee: RIN KAGAKU KOGYO CO., LTD., Imizu (JP)

( * ) Notice: Subject to any disclaimer, the term of this patent is extended or adjusted under 35 U.S.C. 154(b) by 859 days.

(21) Appl. No.: 17/762,182

(22) PCT Filed: Jun. 3, 2020

(86) PCT No.: PCT/JP2020/022000
§ 371 (c)(1),
(2) Date: Mar. 21, 2022

(87) PCT Pub. No.: WO2021/152878
PCT Pub. Date: Aug. 5, 2021

(65) Prior Publication Data
US 2022/0371892 A1    Nov. 24, 2022

(30) Foreign Application Priority Data

Jan. 29, 2020  (JP) .................................. 2020-012115

(51) Int. Cl.
*C01B 25/047*    (2006.01)
*C01B 25/20*    (2006.01)
*C01B 32/30*    (2017.01)

(52) U.S. Cl.
CPC ............ *C01B 25/047* (2013.01); *C01B 25/20* (2013.01); *C01B 32/30* (2017.08); *C01P 2006/16* (2013.01)

(58) Field of Classification Search
None
See application file for complete search history.

(56) References Cited

U.S. PATENT DOCUMENTS

| | | | |
|---|---|---|---|
| 5,283,042 A | 2/1994 | Legrand et al. | |
| 5,883,040 A * | 3/1999 | Armstrong | C01B 32/336 502/437 |
| 5,989,509 A | 11/1999 | Gunkel et al. | |
| 6,146,610 A | 11/2000 | Gunkel | |
| 2012/0009112 A1 | 1/2012 | Kinose et al. | |
| 2019/0202698 A1 | 7/2019 | Hansel et al. | |

FOREIGN PATENT DOCUMENTS

| | | | |
|---|---|---|---|
| CA | 3033330 A1 * | 2/2018 | ............ B01J 20/20 |
| CN | 105600762 A | 5/2016 | |
| JP | 4-295006 A | 10/1992 | |
| JP | 2002-516809 A | 6/2002 | |
| JP | 2012-17230 A | 1/2012 | |
| JP | 2017-177047 A | 10/2017 | |

OTHER PUBLICATIONS

Communication issued on Aug. 30, 2023 by the China National Intellectual Property Administration for Chinese Patent Application No. 202080065829.3.
Communication issued on Apr. 11, 2024 by the China National Intellectual Property Administration for Chinese Patent Application No. 202080065829.3.
Communication issued on Feb. 29, 2024 by the National Office of Intellectual Property of Vietnam (NOIP) for Vietnamese Patent Application No. 1-2022-01726.
Communication issued Jun. 28, 2022 by the Japanese Patent Office in Japanese Patent Application No. 2021-574439.
International Search Report (PCT/ISA/210) dated Aug. 4, 2020, issued by the International Searching Authority in counterpart International Application No. PCT/JP2020/022000.
Written Opinion (PCT/ISA/237) dated Aug. 4, 2020, issued by the International Searching Authority in counterpart International Application No. PCT/JP2020/022000.

* cited by examiner

Primary Examiner — Yun Qian
(74) Attorney, Agent, or Firm — Sughrue Mion, PLLC

(57) ABSTRACT

The disclosure relates to a method for purifying yellow phosphorus including bringing yellow phosphorus and wood-based activated carbon into contact with each other. The disclosure also relates to a method for producing high-purity phosphoric acid including generating a gas of phosphorus pentoxide by burning yellow phosphorus obtained by the purifying method and then hydrating the gas.

2 Claims, No Drawings

METHOD FOR PURIFYING YELLOW PHOSPHORUS AND METHOD FOR PRODUCING HIGH-PURITY PHOSPHORIC ACID

CROSS-REFERENCE TO RELATED APPLICATIONS

This application is a National Phase Entry of PCT International Application No. PCT/JP2020/022000, filed on Jun. 3, 2020, which claims priority to Japanese Patent Application No. 2020-012115, filed on Jan. 29, 2020, the contents of all of which are incorporated herein by reference in their entirety.

TECHNICAL FIELD

The present disclosure relates to purification of yellow phosphorus, and in particular, an object of the present disclosure is to provide yellow phosphorus that is preferably used as a raw material for high-purity phosphoric acid used for etching electronic materials.

BACKGROUND ART

Phosphoric acid is used for an etching agent for semiconductors and LCDs. Following the miniaturization of DRAM and flash memories and improvement of the functions or the definition of FPDs, phosphoric acid with higher quality has been required. In some cases, phosphoric acid in which a metal element is contained to a lower extent in an amount of around several parts per billion is required. Impurities in phosphoric acid include arsenic and antimony, which belong to the same group as phosphorus. Although arsenic can be removed by the blowing of hydrogen sulfide gas, the solubility of antimony sulfide in phosphoric acid is relatively high, and the demand of the market cannot always be met. As a method for reducing metal elements in phosphoric acid, one of the solutions is purification of yellow phosphorus, which is the raw material. Regarding antimony in particular, antimony in yellow phosphorus moves to phosphoric acid, and thus antimony at around one fourth of the antimony content of yellow phosphorus is contained in 85% phosphoric acid. Therefore, when yellow phosphorus containing 100 ppb or less of antimony is used, 85% phosphoric acid containing 25 ppb or less of antimony can be obtained.

As a method for purifying yellow phosphorus, many reports on treatment with an oxidizing agent such as nitric acid and hydrogen peroxide have been made. For example, PTL 1 discloses that antimony <0.1 ppm was achieved through treatment of yellow phosphorus with hydrogen peroxide. PTL 2 discloses that treating with a mixture solution containing calcium iodate and hydrogen peroxide allows for achieving 0.05 ppm of the antimony content of yellow phosphorus after the treatment. Moreover, PTL 3 discloses that, treating with an aqueous solution containing iodic acid and a chelating agent such as EDTA-4Na allows for obtaining yellow phosphorus of several dozen parts per billion. Such methods, which use an oxidizing agent, however, have a risk of localized progress of reaction depending on the concentration of the oxidizing agent or the treatment temperature, and the control is complicated. Moreover, a part of yellow phosphorus is oxidized to be phosphoric acid, resulting in a decrease in the yield, and this causes another problem of the necessity for disposal of the phosphoric acid-containing solution.

PTL 4 describes a method for purifying yellow phosphorus using activated carbon. However, the activated carbon is specified by the shape, the particle size and the specific surface area, and the purification effects are assessed by the organic impurity content. PTL4 neither discloses nor suggests the kind of raw material for the activated carbon, the average pore diameter and the effect of reducing antimony.

Accordingly, a purification method that allows for reducing antimony in yellow phosphorus and avoiding the risk of exothermic reaction due to the treatment with an oxidizing agent and that results in a small loss of phosphorus is required.

CITATION LIST

Patent Literature

PTL 1: U.S. Pat. No. 5,989,509
PTL 2: JP 2002-516809 A
PTL 3: JP 2012-17230 A
PTL 4: US 2019/0202698 A1

SUMMARY OF INVENTION

Technical Problem

As explained above, a method for purifying yellow phosphorus that uses no oxidizing agent and that results in a small loss of phosphorus is required. An object of the disclosure is to provide a method for purifying yellow phosphorus that allows for obtaining yellow phosphorus having an antimony content of, for example, 100 ppb or less. Another object of the disclosure is to provide a method for producing high-purity phosphoric acid using the purified yellow phosphorus.

Solution to Problem

As a result of extensive investigation to solve the problems, the present inventors have found that bringing yellow phosphorus into contact with specific activated carbon allows the antimony content to be 100 ppb or less.

That is, the first method to be provided by the disclosure is a method for purifying yellow phosphorus including bringing yellow phosphorus into contact with wood-based activated carbon.

The second method to be provided by the disclosure is a method for producing high-purity phosphoric acid by generating a gas of phosphorus pentoxide by burning high-purity yellow phosphorus obtained by the first method and then hydrating the gas.

Advantageous Effects of Invention

The method for purifying yellow phosphorus of the disclosure allows for avoiding the risk of exothermic reaction due to treatment with an oxidizing agent and for obtaining yellow phosphorus having an antimony content of 100 ppb or less with a small loss of phosphorus. The method of the disclosure allows for using the purified yellow phosphorus as a raw material to provide high-purity phosphoric acid having an antimony content of 25 ppb or less.

DESCRIPTION OF EMBODIMENTS

For the yellow phosphorus used in the first method, generally distributed yellow phosphorus can be used as the raw material. Reducing other impurities, for example, through distillation or treatment with an oxidizing agent prior to the contact with the activated carbon also allows for reducing antimony more efficiently. Yellow phosphorus is a pale yellow waxy solid having specific gravity of 1.8 and a melting point of 44.1° C., and yellow phosphorus is stored and handled in the presence of water because yellow phosphorus combusts spontaneously in the air.

The activated carbon used in the disclosure is wood-based activated carbon. The wood-based activated carbon is activated carbon produced from a wood-based raw material and produced, for example, from charcoal, sawdust, bark, lignin, sawdust carbide, bamboo or the like. In particular, wood-based activated carbon having an average pore diameter of 2.5 nm or more determined by the nitrogen gas adsorption method is suitable, and wood-based activated carbon having an average pore diameter of 2.5 nm to 5.0 nm is more preferable. Commercial products are available from Taihei Chemical Industrial Co., Ltd., Osaka Gas Chemicals Co., Ltd., Kuraray Co., Ltd., Futamura Chemical Co., Ltd. and the like.

When yellow phosphorus is heated at or above the melting point to be liquid, the yellow phosphorus can be brought into contact with the activated carbon effectively. As the temperature increases, the viscosity of the yellow phosphorus decreases, and this allows the contact with the activated carbon to be more efficient. On the other hand, as the temperature decreases, the solubility of the impurities in the yellow phosphorus decreases, and the impurities precipitate more easily. This results in the improvement of the adsorption effect onto the activated carbon. Therefore, the yellow phosphorus is brought into contact with the activated carbon generally at 60° C. or higher and 80° C. or lower.

The contact period depends on the raw material and the aimed antimony content but is generally 30 minutes or longer, preferably 50 minutes or longer. A longer contact period results in an increase of an antimony adsorption amount. The yellow phosphorus and the activated carbon may be brought into contact by either a batch process, which uses a bath to bring the yellow phosphorus and the activated carbon into contact, or a continuous process, which uses a column to bring the yellow phosphorus and the activated carbon into contact, or by a merry-go-round process, which performs continuous treatment using multiple columns.

After the contact with the wood-based activated carbon, the yellow phosphorus is separated from the activated carbon through filtration, centrifugation or the like.

The method for purifying yellow phosphorus of the first method allows for reducing not only antimony but also metal elements and organic materials to some extent, though the reduction effect varies depending on the target, and the purified yellow phosphorus can be used as a raw material for high-purity products. For example, the yellow phosphorus can be used also as a raw material for the production of phosphorus trichloride, phosphorus oxychloride, phosphoric anhydride or the like or a raw material for the production of high-purity phosphoric acid used for an etching agent for semiconductors and LCDs.

The second method is a method for producing high-purity phosphoric acid including generating a gas of phosphorus pentoxide by burning high-purity yellow phosphorus obtained by the first method and then hydrating the gas. The reaction for producing phosphoric acid from yellow phosphorus is shown by the following reaction equations.

$$P_4 + 5O_2 \rightarrow 2P_2O_5 \quad (1)$$

$$P_2O_5 + 3H_2O \rightarrow 2H_3PO_4 \quad (2)$$

Phosphoric acid is produced in facilities for dry process to produce phosphoric acid equipped with a combustion chamber and a hydration chamber, from yellow phosphorus obtained by the first method. The yellow phosphorus and a sufficient amount of air are introduced into the combustion chamber to oxidize the yellow phosphorus, and the combustion gas is absorbed by water or dilute phosphoric acid in the hydration chamber to obtain phosphoric acid. In this manner, high-purity phosphoric acid containing, for example, 25 ppb or less of antimony in terms of 85% phosphoric acid can be obtained. When other metal elements should be reduced according to the demands for application, generally used sulfide treatment may be conducted. In general, hydrogen sulfide gas is blown in to precipitate metal elements as sulfides, and after filtration, the hydrogen sulfide gas is removed.

EXAMPLES

The disclosure is explained specifically below by preferable Examples of the disclosure and Comparative Examples which are compared therewith.

The average pore diameters of the activated carbons were measured by the gas adsorption method using "BELSORP-max" manufactured by MicrotracBEL Corp. using nitrogen as the adsorbate while changing the measurement pressure from 0.001 Pa to 100000 Pa. The antimony contents of yellow phosphorus were measured by taking 1 to 3 g of solidified yellow phosphorus, decomposing it with nitric acid and perchloric acid, then diluting the decomposed one with water and measuring the dilution by ICP-MS. The raw materials for the activated carbons of the Examples and the Comparative Examples, the average pore diameters (nm) of the activated carbons, the contact processes for purification, the amount (mass %) of activated carbon added to yellow phosphorus, the contact periods (minutes) and the antimony contents (before the contact with activated carbon (ppm) and after the contact with activated carbon (ppb)) are shown in Table 1 (below).

Example 1

Into a 100 mL beaker, 40 g of yellow phosphorus having an antimony content of 6.0 ppm and ion-exchanged water were put, and the yellow phosphorus was submerged in water. Wood-based activated carbon "Taiko SG840A" manufactured by Futamura Chemical Co., Ltd. in an amount of 10 mass % based on the yellow phosphorus amount was added. This sample was heated, kept at 70° C., stirred for two hours in a state that yellow phosphorus was liquid and then the sample was filtered. The antimony content of the obtained yellow phosphorus was 73 ppb.

Example 2

Into a 100 mL beaker, 40 g of yellow phosphorus having an antimony content of 6.8 ppm and ion-exchanged water were put, and the yellow phosphorus was submerged in water. Wood-based activated carbon "refined Umebachi-jirushi activated carbon" manufactured by Taihei Chemical Industrial Co., Ltd. in an amount of 10 mass % based on the yellow phosphorus amount was added. This sample was heated, kept at 70° C., stirred for 24 hours in a state that yellow phosphorus was liquid and then the mixture was filtered. The antimony content of the obtained yellow phosphorus was 27 ppb.

Example 3

A column having a diameter of 1.1 cm and a length of 15 cm was filled with wood-based activated carbon "Umebachi-jirushi activated carbon for chromatography" manufactured by Taihei Chemical Industrial Co., Ltd. to a length of 14 cm. Yellow phosphorus and ion-exchanged water were fed into a yellow phosphorus storage tank, and the column was connected to the yellow phosphorus storage tank and a yellow phosphorus receiver tank. The yellow phosphorus storage tank and the yellow phosphorus receiver tank were sealed with ion-exchanged water, and the whole system was kept at 70° C. After the yellow phosphorus in the yellow phosphorus storage tank melted, the yellow phosphorus was caused to slowly pass through the column, and the yellow phosphorus discharged from the column was received in the yellow phosphorus receiver tank. The retention period of the yellow phosphorus in the column was 63 minutes. The antimony content, which was 5.5 ppm before the purification, decreased to 58 ppb.

Example 4

Into a 100 mL beaker, 40 g of yellow phosphorus having an antimony content of 6.0 ppm and ion-exchanged water were put, and the yellow phosphorus was submerged in water. Wood-based activated carbon "Taiko S" manufactured by Futamura Chemical Co., Ltd. in an amount of 10 mass % based on the yellow phosphorus amount was added, and the mixture was heated, stirred at 70° C. for two hours and then the mixture was filtered. The antimony content of the obtained yellow phosphorus was 18 ppb.

Example 5

A column having a diameter of 1.1 cm and a length of 30 cm was filled with wood-based activated carbon "granule Umebachi DP-jirushi activated carbon" manufactured by Taihei Chemical Industrial Co., Ltd. to a length of 29 cm. Yellow phosphorus and ion-exchanged water were fed into a yellow phosphorus storage tank, and the column was connected to the yellow phosphorus storage tank and a yellow phosphorus receiver tank. The yellow phosphorus storage tank and the yellow phosphorus receiver tank were sealed with ion-exchanged water, and the whole system was kept at 70° C. After the yellow phosphorus in the yellow phosphorus storage tank melted, the yellow phosphorus was caused to slowly pass through the column, and the yellow phosphorus discharged from the column was received in the yellow phosphorus receiver tank. The retention period of the yellow phosphorus in the column was 148 minutes. The antimony content, which was 133 ppb before the purification, decreased to 4 ppb.

Comparative Example 1

Into a 100 mL beaker, 40 g of yellow phosphorus having an antimony content of 6.0 ppm and ion-exchanged water were put, and the yellow phosphorus was submerged in water. Coal-derived activated carbon "Taiko GM830A" manufactured by Futamura Chemical Co., Ltd. in an amount of 10 mass % based on the yellow phosphorus amount was added, and the mixture was heated, stirred at 70° C. for two hours and then the mixture was filtered. The antimony content of the obtained yellow phosphorus was 2.3 ppm.

Comparative Example 2

Into a 100 mL beaker, 40 g of yellow phosphorus having an antimony content of 6.5 ppm and ion-exchanged water were put, and the yellow phosphorus was submerged in water. Coal-derived activated carbon "Burokoru C MC" manufactured by Taihei Chemical Industrial Co., Ltd. in an amount of 10 mass % based on the yellow phosphorus amount was added, and the mixture was heated, stirred at 70° C. for 24 hours and then the mixture was filtered. The antimony content of the obtained yellow phosphorus was 300 ppb.

Comparative Example 3

Into a 100 mL beaker, 40 g of yellow phosphorus having an antimony content of 6.5 ppm and ion-exchanged water were put, and the yellow phosphorus was submerged in water. Coconut husk-derived activated carbon "Yashikoru SC" manufactured by Taihei Chemical Industrial Co., Ltd. in an amount of 10 mass % based on the yellow phosphorus amount was added, and the mixture was heated, stirred at 70° C. for 24 hours and then the mixture was filtered. The antimony content of the obtained yellow phosphorus was 1.4 ppm.

TABLE 1

| | Example 1 | Example 2 | Example 3 | Example 4 | Example 5 | Comparative Example 1 | Comparative Example 2 | Comparative Example 3 |
|---|---|---|---|---|---|---|---|---|
| Activated Carbon Raw Material | Wood-Based | Wood-Based | Wood-Based | Wood-Based | Wood-Based | Coal | Coal | Coconut Husk |
| Average Pore Diameter (nm) of Activated Carbon | 3.6 | 2.7 | 3.7 | 4.5 | 3.5 | 2.3 | 2.0 | 1.8 |
| Contact Process | Batch Process | Batch Process | Column | Batch Process | Column | Batch Process | Batch Process | Batch Process |
| Amount of Activated Carbon Added to Yellow Phosphorus (mass %) | 10 | 10 | | 10 | | 10 | 10 | 10 |
| Contact Period (min) | 120 | 1440 | 63 | 120 | 148 | 120 | 1440 | 1440 |
| Antimony Content | | | | | | | | |
| Before Contact with Activated Carbon (ppm) | 6.0 | 6.8 | 5.5 | 6.0 | 0.133 | 6.0 | 6.5 | 6.5 |
| After Contact with Activated Carbon (ppb) | 73 | 27 | 58 | 18 | 4 | 2300 | 300 | 1400 |

Example 6

Yellow phosphorus was obtained by the same treatment as that of Example 4.

Using the obtained yellow phosphorus, phosphoric acid was produced using facilities for dry process to produce phosphoric acid equipped with a combustion chamber and a hydration chamber. The yellow phosphorus and air for combustion were introduced into the combustion chamber to oxidize the yellow phosphorus, and the combustion gas was absorbed by ion-exchanged water in the hydration chamber to obtain 85% phosphoric acid. The antimony content of thus obtained 85% phosphoric acid was 5 ppb.

Although the present invention has been explained in detail referring to specific embodiments, it is obvious to one skilled in the art that various changes and modifications are possible without departing from the spirit and the scope of the invention.

The present application is based on a Japanese patent application filed on Jan. 29, 2020 (patent application No. 2020-12115), which is incorporated by reference in its entirety. All the references cited here are incorporated in their entirety.

INDUSTRIAL APPLICABILITY

The method for purifying yellow phosphorus of the disclosure allows for avoiding a risk of exothermic reaction as in treatment with an oxidizing agent, achieving a reduced loss of phosphorus and reducing the antimony content to, for example, 100 ppb or less. Moreover, the method of the disclosure allows for using the high-purity yellow phosphorus as a raw material to provide high-purity phosphoric acid having an extremely low antimony content.

The invention claimed is:

1. A method for producing purified yellow phosphorus, comprising bringing liquid yellow phosphorus and an activated carbon into contact with each other, wherein the activated carbon is produced from a wood raw material, the wood raw material is at least one member selected from the group consisting of sawdust, bark, lignin, sawdust carbide, and bamboo, and
   wherein the contact of the yellow phosphorus and the activated carbon is performed at 60° C. or higher and 80° C. or lower, and
   the average pore diameter of the weed-based-activated carbon is 2.5 nm to 5.0 nm more.

2. The method for producing purified yellow phosphorus according to claim 1, wherein a contact period of the yellow phosphorus and the activated carbon is 50 minutes or longer.

\* \* \* \* \*